United States Patent [19]

Asai

[11] Patent Number: 4,690,381

[45] Date of Patent: Sep. 1, 1987

[54] PULLEY BLOCK ASSEMBLY FOR AERIAL LINE

[75] Inventor: Masaki Asai, Nagoya, Japan

[73] Assignee: Meitoh Denki Kohji Kabushiki Kaisha, Aichi, Japan

[21] Appl. No.: 752,692

[22] Filed: Jul. 8, 1985

[51] Int. Cl.[4] .................... B66D 3/06; H02G 1/02
[52] U.S. Cl. .................. 254/394; 254/134.3 R; 254/400; 254/406; 254/411
[58] Field of Search ............ 254/134.3 R, 134.3 PH, 254/134.5, 390, 393, 394, 374, 400, 401, 402, 403, 404, 405, 406, 409, 411, 412, 413, 388

[56] References Cited

U.S. PATENT DOCUMENTS

| | | | |
|---|---|---|---|
| 856,335 | 6/1907 | Callahan | 254/409 |
| 878,054 | 2/1908 | Foote | 254/411 |
| 926,878 | 7/1909 | Kelley | 254/411 |
| 1,209,344 | 12/1916 | Slavens | 254/409 |
| 1,424,503 | 8/1922 | Manges | 254/409 |
| 1,953,210 | 4/1934 | Becker | 254/388 |
| 2,491,069 | 12/1949 | Anderson et al. | 254/406 |
| 2,649,282 | 8/1953 | Fate | 254/406 |
| 3,042,374 | 7/1962 | Livingston | 254/134.3 R |
| 3,070,355 | 12/1962 | Wyatt | 254/134.3 R |
| 3,134,575 | 5/1964 | Walter | 254/409 X |
| 3,191,910 | 6/1965 | Eitel | 254/406 |
| 3,235,228 | 2/1966 | Lindsey | 254/134.3 PH |
| 3,822,862 | 7/1974 | Lindsey et al. | 254/134.3 PH X |
| 3,834,674 | 9/1974 | Jackson | 254/394 |
| 3,918,685 | 11/1975 | Lindsey et al. | 254/134.3 PH |
| 4,423,853 | 1/1984 | Davis | 254/393 X |

FOREIGN PATENT DOCUMENTS

| | | | |
|---|---|---|---|
| 854784 | 4/1940 | France | 254/134.3 R |
| 292048 | 6/1928 | United Kingdom | 254/400 |

Primary Examiner—Stuart S. Levy
Assistant Examiner—Joseph J. Hail, III
Attorney, Agent, or Firm—Armstrong, Nikaido, Marmelstein & Kubovcik

[57] ABSTRACT

A pulley block assembly having a pulley block unit for an aerial line, comprising a pulley frame, a pulley rotatably supported by the pulley frame, and an inverting guide roller rotatably supported by the pulley frame opposite to the pulley in the pulley frame. The inverting guide roller has a peripheral helical groove in which the aerial line can be frictionally fitted.

14 Claims, 13 Drawing Figures

PULLEY BLOCK ASSEMBLY FOR AERIAL LINE

BACKGROUND OF THE INVENTION

1. Field of the Invention

This invention relates to a pulley block which can be advantageously used to string or exchange an aerial line.

When an aerial line, such as an overhead electrical conductor, grid, or signal line is exchanged with a new one, or when an aerial line is newly strung between outdoor towers or poles, a so-called pulley block method in which pulley blocks are hung from a rope is widely used.

2. Description of the Related Art

In the pulley block method, which will be discussed in detail hereinafter, a plurality of pulley blocks are hung from a rope at an appropriate distance to feed a new line therethrough. The rope is loosened or tensed to run the pulley blocks upside down.

In the pulley block method of the prior art, however, the pulley blocks are not always turned in the same direction, due to a torsion which the rope and/or the line (conductor) has, or to the wind which blows the line in course of stringing or exchanging operation when the pulley blocks are inverted, thus resulting in a decrease of the efficiency of the operation.

SUMMARY OF THE INVENTION

The primary object of the present invention is, therefore, to provide an improved pulley block assembly which can easily invert all the pulley blocks in the same direction at one time.

According to the present invention, in order to achieve the object mentioned above, the pulley block assembly includes a pulley frame which has a rope holder rigidly connected thereto, a rotational pulley which is provided in the pulley frame to guide a conductor or a line, and an inverting guide roller which is opposed to the pulley in the pulley frame and which has a helical groove.

With the arrangement, when the line is loosened or tensed after it is brought into the helical groove of the guide roller, the pulley blocks arranged on the rope at a predetermined distance can be inverted in the same direction at one time.

BRIEF DESCRIPTION OF THE DRAWINGS

The invention will be described below in detail, with reference to the accompanying drawings, in which.

DESCRIPTION OF THE PREFERRED EMBODIMENT

Figure 1:
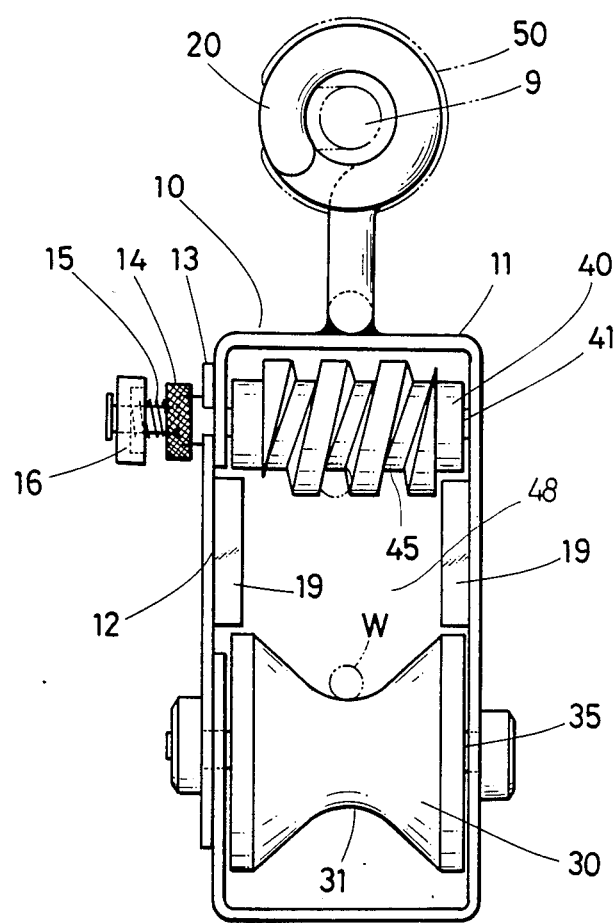
FIG. 1 is a front elevational view of a pulley block according to a preferred embodiment of the invention.
Figure 2:
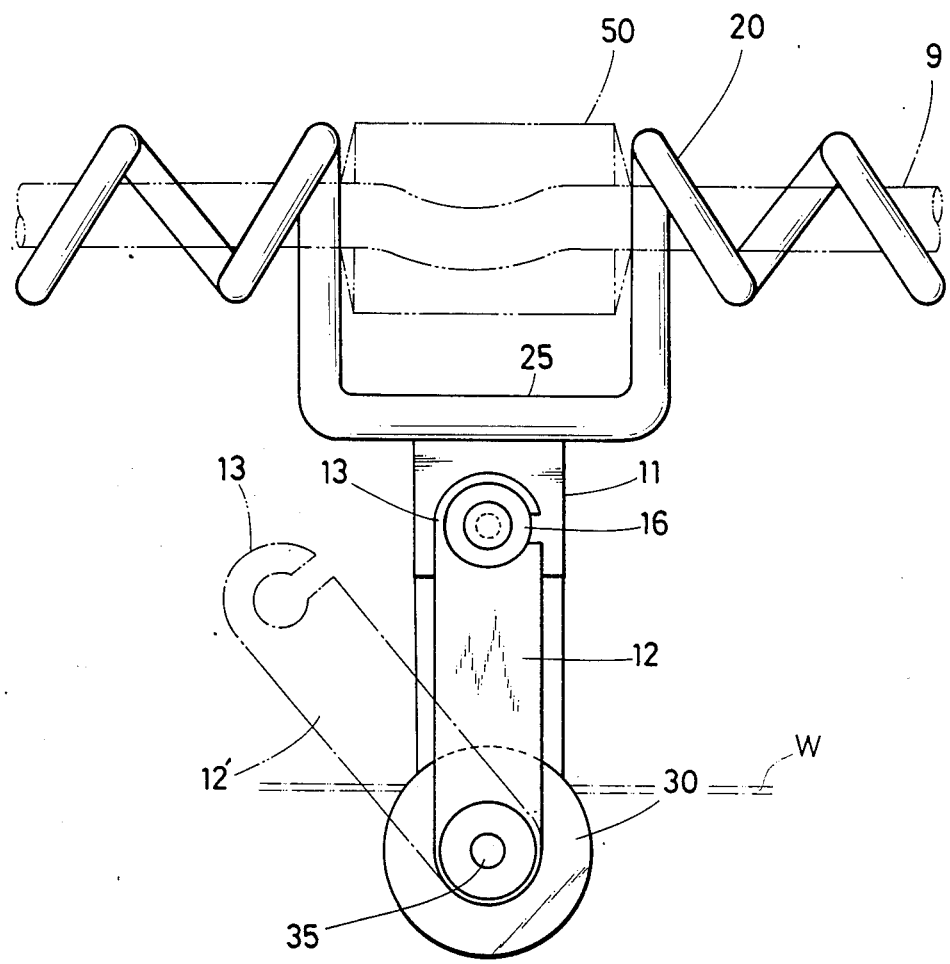
FIG. 2 is a side elevational view of a pulley block shown in FIG. 1.

As can be seen from FIGS. 1 and 2, the pulley block of the present invention which is shown generally at 10 essentially has a rope holder 20 which is adapted to hang the pulley block from a rope 9 and a pulley frame 11 which is rigidly connected to the rope holder 20 at the top of the pulley frame and which is generally of rectangular shape in section, as shown in FIG. 1.

In the pulley frame 11 is provided a pulley 30 which is supported on a shaft 35 which is in turn rotatably held by the pulley frame 11. A conductor W can be fed by and along the pulley frame 30, as will be apparent below. Also in the pulley frame 11 is provided an inverting guide roller 40 which is opposed to the pulley 30 and which has a helical groove 45 on its outer periphery.

The rope holder 20 is, preferably in the form of an extended coil as shown in FIG. 2, so that the rope 9 can be laterally inserted in the rope holder 20 along the turn of the coil.

The coiled rope holder 20 has generally rectangular stop holders 25 along the length of the rope holder 20. A predetermined number of pulley blocks 10 can be rigidly connected to the rope holder 20 by means of the stop holders 25. Also, the stop holders 25 hold therein respective rope stop 50 which will be described below. Namely, the rope 9 can be immovably held in the direction of the length thereof by the rope holder 20 when the rope stops 50 are held in the respective stop holders 25.

Figure 7:
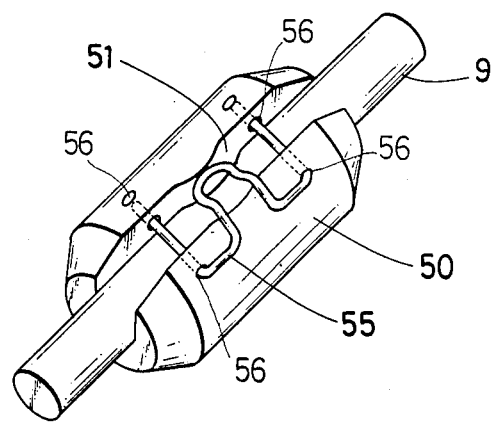
FIG. 7 is a perspective view of a rope holder.

As will be apparent from FIG. 7, the rope 9 is held by and in a partially bent channel 51 which is provided in the rope stop 50. The bend of the partial channel 51 prevents both a relative rotation and a relative displacement of the rope 9 to the rope stop 50.

The rope 9 is prevented from coming out of the channel 51 by means of a clip pin 55 which is inserted in corresponding pin holes 56 formed in the rope stop 50 after the rope 9 is located in the channel 51. The rope stops 50 can rotate in the respective stop holders 25, together with the rope 9. Namely, when a rotational torque which is, for example, produced by the torsion of the rope 9 is exerted on the rope 9, the rope 9 can rotate together with the rope stops 50 in the respective stop holders 25.

As mentioned before, a plurality of pulley blocks 10 can be arranged on and along the rope 9 at a predetermined distance by the rope stops 50 which are capable of rotating with respect to the rope holder 20. Furthermore, since the rope stops 50 are integrally connected to the rope 9 so as to rotate therewith, when twisting of the rope 9 takes place, the rope stops 50 rotate together with the rope 9, so that the torsion of the rope 9 can be automatically absorbed or eliminated. This results in the prevention of an accidental swing or rotation of the pulley blocks which otherwise would take place, due to the torsion of the rope 9.

The pulley 30 located in the pulley frame 11 opposite to the rope holder 20 has a concave body 31 which holds thereon the conductor W without coming out of the concave body. The concave body can be replaced with a cylindrical body which has a central circumferencial groove or recess in which the conductor W can be fitted. The pulley is supported by the rotatable shaft 35 on the pulley frame 11, as mentioned before.

The inverting guide roller 40 is located opposite to the pulley 30 in the pulley frame 11 and adjacent to the rope holder 20, as mentioned before. The guide roller 40 is spaced from the pulley 30 in the pulley frame 11, so that a space 48 is provided therebetween in which the conductor W can move between the pulley 30 and the guide roller 40. When the rope 9 is loosened to invert the pulley block(s) 10, the pulley block is lowered by its dead weight, so that the conductor W which remains at its initial height position comes into the helical groove 45 of the guide roller 40 which is lowered together with the pulley block 10. Consequently, the pulley block 10 is twisted when the guide roller 40 is rotated by pulling the conductor W in the direction of the length thereof, while engaging the conductor W in the helical groove 45. Namely, the rotation of the guide roller 40 about the axis of the shaft 41 causes the rotational movement of the pulley block about the axis of the conductor W. Thus all the pulley blocks 10 connected to the same rope 9 rotate in the same direction about the conductor W and come to an inverted position at one time.

The guide roller 40 is rotatably supported on the shaft 41 which is turn supported by the pulley frame 11.

It should be noted that the helical groove 45 may be replaced with any means for guiding the conductor W and for converting the movment of the conductor W in the direction of the length thereof to a rotational movement of the pulley block about the axis of the conductor in one direction.

A side frame 12 which constitutes a part of the pulley frame 11 is, at its one end, rotatably attached to the shaft 35, as shown in FIG. 2. The side frame 12 has, at its opposite end, a hook portion 13 which can be engaged by and disengaged from an outer end of the shaft 41 of the guide roller 40. When the hook portion 13 of the side frame 12 comes into engagement with the outer end of the shaft 41, the hook portion 13 is prevented from disengaging therefrom by means of an annular stop 14 which is in turn attached to the outer end of the shaft 41 and which is pressed against the hook portion 13 by a spring 15. A set bolt 16 is screwed in the outer end of the shaft 41 to support the opposite outer end of the spring 15. The annular stop 14 can be separated from the side frame 12 against the spring 15 to bring the side frame 12 into an open position 12' in which the hook portion 13 of the side frame 12 is disengaged from the shaft 41. On the other hand, a position in which the hook portion 13 of the side frame 12 engages with the outer end of the shaft 41 will be referred to as a closed position. Therefore, the side frame 12 can rotate about the shaft 35 between the open position 35 between the open position and the closed position.

The numeral 19 in FIG. 1 designates plastic covers which are mounted to the pulley frame 11 and the side frame 12 to prevent the conductor W from coming into direct contact with the frames 11 and 12 when the pulley blocks are inverted or when the conductor W is pulled in the pulley frame. Otherwise, if the conductor W comes into direct contact with the side frame or pulley frame, the conductor will be damaged or may be broken in the worst case.

FIG. 3(a) to (e) show different stages of the exchanging operation of an old conductor W1 for a new conductor W2 by using the pulley block assembly of the invention.

Figure 3:
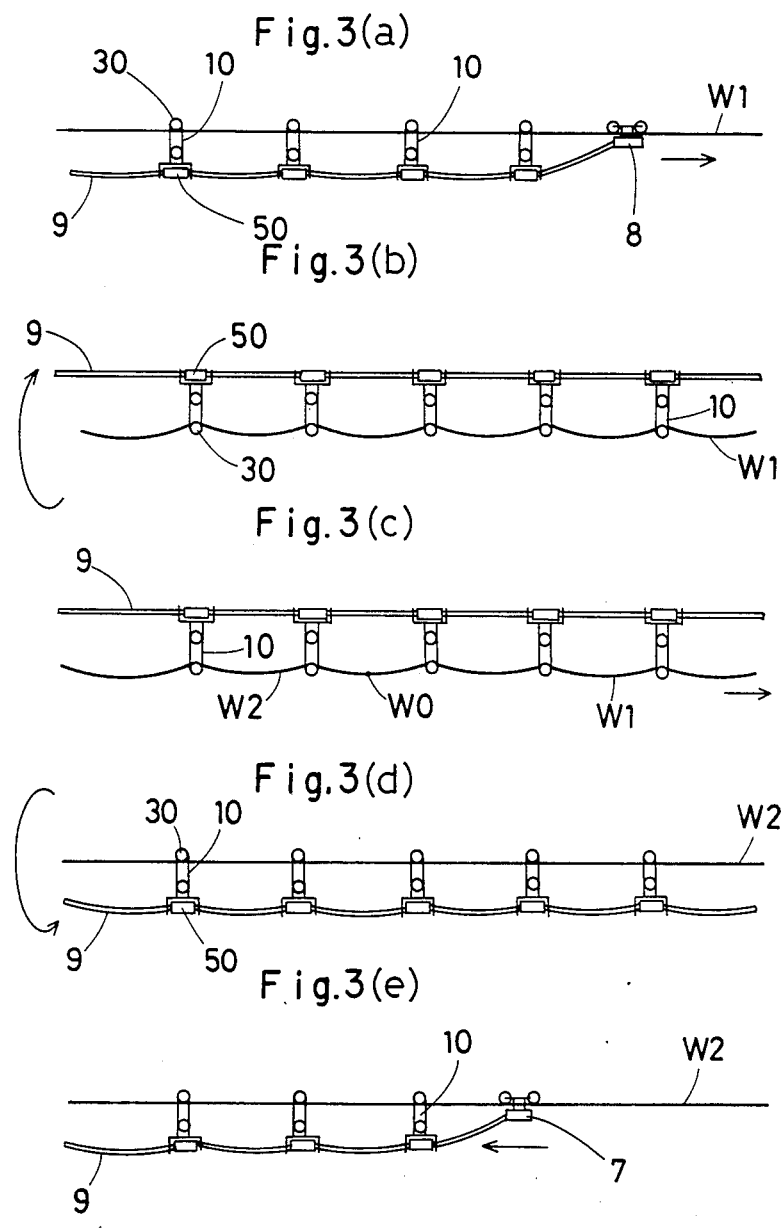
FIG. 3 (a) to (e) are schematic views of a pulley block assembly of the present invention in different stages of an exchanging operation of a conductor.

In FIG. 3(a), the rope 9 which is made of, for example, nylon has a plurality of pulley blocks 10 at a predermined distance along the length of the rope 9. The distance between the adjacent pulley blocks is 15 m in the illustrated embodiment. First, the existing old conductor W1 is inserted in the pulley frame 11 of the pulley blocks 10 so that the pulley blocks 10 are hung from the old conductor W1 by the pulleys 30. Namely, in the first stage, the pulley blocks 10 shown in FIG. 1 are hung from the conductor W1 in an inverted state, i.e. with the rope holder 20 down. The pulley blocks 10 are successively fed and the rope 9 is unwound, by a self running carrier 8 which moves on and along the conductor W1, so that the rope 9 extends substantially parallel to the conductor W1 below the latter.

The rope 9 is then pulled upward in the direction shown by an arrow in FIG. 3(b) and tensed, so that the pulley blocks 10 are inverted. Namely, the pulley blocks 10 are brought to an initial position shown in FIG. 1 in which the conductor W1 is located on the pulley 30 and the rope 9 extends above the conductor W1.

After that, the new conductor W2 is tied to an end W0 of the old conductor W1, as shown in FIG. 3(c). Then, the old conductor W1 is drawn out from the pulley blocks 10. Thus the old conductor W1 is replaced with a new conductor W2. This completes the exchanging operation of the old conductor for a new conductor.

Figure 5:
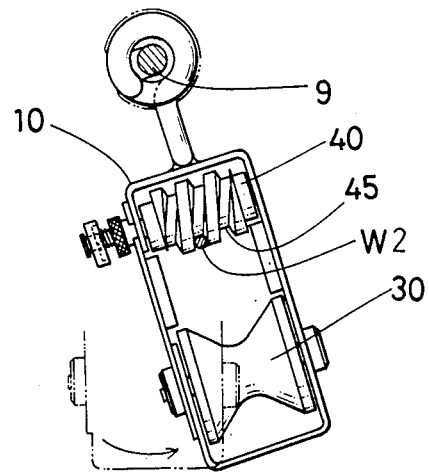
FIG. 5 is a front elevational view of a pulley block in a different position in which the pulley block is being inverted by an inverting guide roller.
Figure 6:
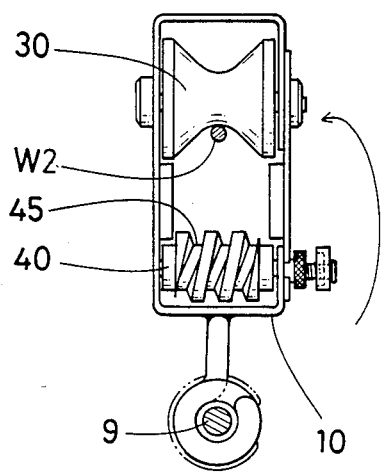
FIG. 6 is a front elevational view of a pulley block which has been completely turned upside down.

After the completion of exchange, the rope 9 is loosened and the conductor W2 is tensed to invert the pulley blocks 10 again. Different stages of the inverting operation of the pulley blocks are illustrated in FIGS. 4, 5 and 6.

Figure 4:
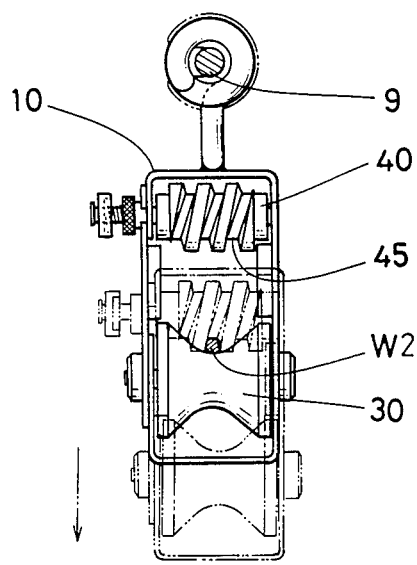
FIG. 4 is a front elevational view of a pulley block in a position in which a rope from which the pulley block is hung is loosened.

Namely, when the rope 9 is loosened, the pulley blocks 10 are lowered to a position shown by dotted-dashed lines, as shown in FIG. 4, so that the guide roller 40 comes onto the conductor W2. That is, the conductor W2 comes into the helical groove 45 of the guide roller 40. The new conductor W2 which is introduced in the helical groove 45 of the guide roller 40 is then pulled in the direction of the length thereof to rotate the guide roller 40 by friction. The rotation of the guide roller 40, about its own axis causes the pulley block 10 to rotate about the axis of the new conductor W2, as mentioned hereinbefore. Thus, the pulley block 10 is inclined and finally inverted, as shown in FIG. 5 and 6. The direction of rotation of the pulley block 10 is determined by changing the direction of pull of the rope 9 in such a way that it is identical to the direction of the wind. Namely the pulley blocks are inclined and turned in a direction toward the downstream side from the upstream side, of the wind.

The direction of the inclination of the pulley blocks can be also reversed by reversing the direction of turns of the helical groove. For this purpose, the pulley blocks 10 are mounted to the rope 9, taking the direction of the wind, into consideration. The pulley blocks 10 which have been inverted are shown in FIG. 3(d) and 6.

After the completion of stringing of the new conductor W2, the rope 9 is pulled back along the new conductor W2 and recovered, as shown in FIG. 3(e). The numeral 7 in FIG. 3(e) designates a brake pulley which is adapted to brake the movement of the pulley blocks 10 in order to prevent the pulley blocks from an uncontrollably quick movement thereof in the course of the return of the rope 9.

Figure 8:
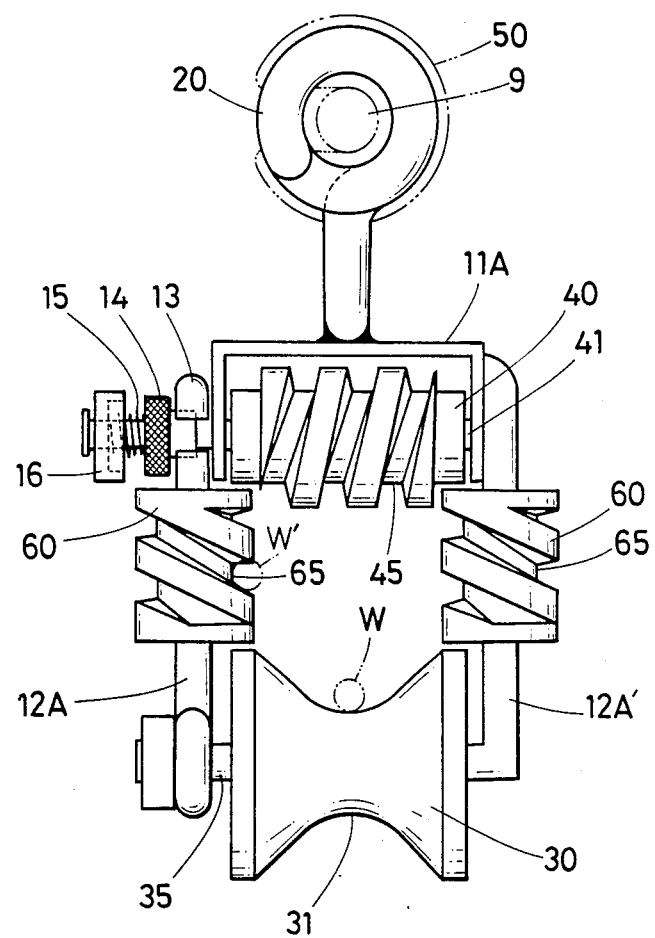
FIG. 8 is a view similar to FIG. 2, but according to a different embodiment of the invention; and, FIG. 9 is a side elevational view of a pulley block shown in FIG. 8.
Figure 9:
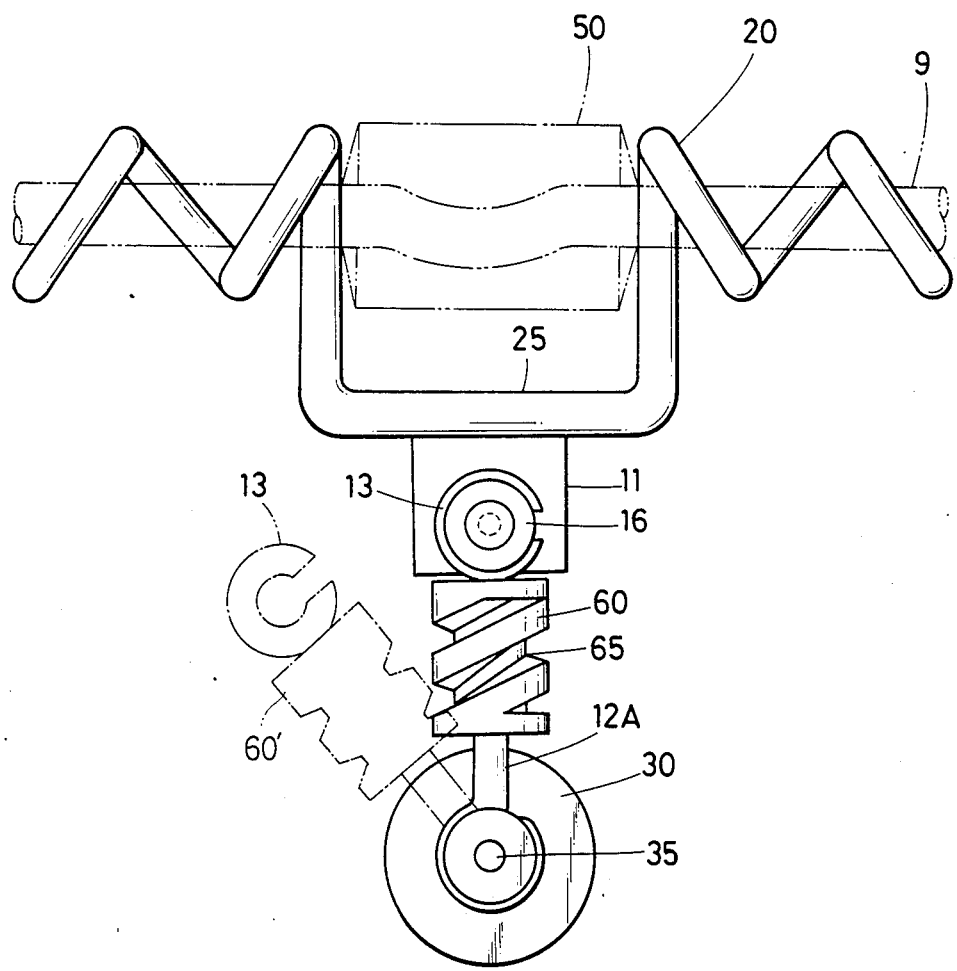

FIG. 8 and 9 shows a different embodiment of a pulley block of the present invention.

In the embodiment illustrated in FIG. 8 and 9, the pulley block has additional side guide rollers 60 located on the opposite sides of the pulley 30. Namely, the side guide rollers 60 are rotatably supported on side frames 12A and 12A'. The side frame 12A' is rigidly connected to the pulley frame 11A. The side frame 12A is similar to the frame 12 in the first embodiment shown in FIG. 1. Namely the side frame 12A is, at its one end, pivoted to the shaft 35 which is an integral part of the side frame 12A' so as to rotate between the open positional 60' and the closed position, as mentioned before. The additional side guide rollers 60 are rotatable about their axes perpendicular to the axes of the pulley and the first guide roller 40.

Each of the side guide rollers 60 has a helical groove 65 similar to the helical groove 45 of the guide roller 40. The side guide roller 60 can bring the conductor W into the helical groove 65 of one of the side guide rollers 60 by loosing the rope 9, when the pulley blocks 10 are inclined in an undersirable direction opposite to a predetermined direction by the wind or other external factors. Namely, when the pulley blocks are inclined by the wind, the rope 9 is first loosened, so that the inclined pulley blocks are lowered and that the conductor W comes into one of the helical grooves 65 of the side guide rollers 60, as shown at W' in FIG. 8, and similarly to FIG. 4. After that, when the conductor W is pulled, the pulley block is turned about the conductor by friction. As a result of the inclination of the pulley block, the conductor can be brought into the helical groove 45 of the guide roller 40. As can be seen foregoing, the side guide rollers 60 are particularly useful when the conductor W can not directly come into the helical groove 45 of the guide roller 40, because of the inclination of the pulley block, due to the wind or the like, even if the rope 9 is loosened to lower the pulley block.

After the conductor W comes into the helical groove 45 of the guide roller 40, the pulley block can be inverted in the same way as the first embodiment.

It will be appreciated that the construction other than the presence of the additional side guide rollers 60 is substantially similar to that of the first embodiment, and accordingly, no additional explanation therefor is given below.

As can be understood from the above discussion, according to the present invention, since there is provided a pulley block assembly which has a pulley block unit having a pulley frame with a rope holder integral therewith, a pulley rotatable supported in the pulley frame, and an inverting guide roller with a helical groove, the pulley block unit can be inverted in the predetermined direction even under the influence of the wind or other external factors. Furthermore, according to the present invention, all the pulley blocks which are connected to a common rope can be inverted in the same direction at one time, by the operation of the rope and the conductor.

According to the present invention, the drawback of the prior art in which the pulley block(s) tend(s) to be inclined or turned in an undesirable direction due to a torsion of the rope or the wind can be eliminated, thus resulting in an increase of the efficiency of the stringing or exchanging operation of a conductor, signal line or grid, or the like and also in a safe operation.

I claim:

1. A pulley-block unit for an aerial line comprising:
   (a) a pulley frame;
   (b) a pulley rotatably supported by said pulley frame; and
   (c) an inverting guide roller rotatably supported by said pulley frame, opposed to and parallel to said pulley, having a helical groove on the periphery thereof; wherein said pulley frame guides an aerial line between said pulley and said inverting guide roller.

2. A pulley block unit according to claim 1, further comprising a rope holder rigidly connected to the pulley frame.

3. A pulley block unit according to claim 2, wherein said rope holder comprises means for rotatably supporting a rope from which the pulley block unit can be hung.

4. A pulley block unit according to claim 1, further comprising a side frame which is pivoted to the pulley frame so as to rotate about the pivot with respect to the pulley frame between a closed position and an open position.

5. A pulley block unit according to claim 4, wherein said side frame comprises hook means for disengageably mounting the free end of the side frame to the pulley frame.

6. A pulley block unit according to claim 5, further comprising locking means for locking the side frame, at the free end thereof, to the pulley frame to maintain the side frame at the closed position.

7. A pulley block unit according to claim 5, further comprising means for preventing the aerial line from coming into direct contact with the pulley frame and the side frame.

8. A pulley block unit according to claim 1, further comprising side guide rollers between the pulley and the inverting guide roller for bringing the aerial line into the helical groove of the inverting guide roller.

9. A pulley block unit according to claim 8, wherein said side guide rollers have helical grooves and are rotatable about respective axes perpendicular to the rotational axis of the inverting guide roller.

10. A pulley block unit according to claim 8, further comprising a side frame which is pivoted to the pulley frame so as to open and close and which rotatably supports one of the said side guide rollers.

11. A pulley block assembly for an aerial line, comprising:
   a pulley block unit which includes a pulley rotatably supported by a pulley frame to guide an aerial line, an inverting guide roller which is rotatably supported by the pulley frame opposed to an parallel to the pulley, the inverting guide roller has a helical groove in which the aerial line can be fitted, and a rope holder rigidly connected to the pulley frame to hang the pulley block unit from a rope, and a fixture which immovably connects the pulley block unit to the rope holder.

12. A pulley block assembly according to claim 11, further comprising means for immovably fixing the pulley frames to the rope in the direction of the length of the rope and for enabling the relative rotation between the rope and the pulley block unit.

13. A pulley block arrangement comprising: a rope, a plurality of pulley block units, each having a pulley frame, a pulley rotatable supported by the pulley frame to guide an aerial line, an inverting guide roller which is rotatably supported by the pulley frame opposite to and parallel to the pulley, the inverting guide roller has a helical groove in which the aerial line can be fitted, and a rope holder rigidly connected to the pulley frame to hang the pulley block unit from the rope, fixtures each for the respective pulley block units for rigidly connecting the pulley frames to the rope holder, stops for connecting the respective fixtures to the rope immovably in the direction of the length of the rope at a predetermined distance.

14. An arrangement according to claim 13, wherein said rope holder is in the form of an expanded coil to which the pulley block units are connected at a predetermined distance along the length of the coil.

* * * * *